United States Patent
Lee et al.

(10) Patent No.: US 9,130,671 B2
(45) Date of Patent: Sep. 8, 2015

(54) APPARATUS FOR MONITORING FAILURE POSITIONS IN WAVELENGTH DIVISION MULTIPLEXING-PASSIVE OPTICAL NETWORKS AND WAVELENGTH DIVISION MULTIPLEXING-PASSIVE OPTICAL NETWORK SYSTEMS HAVING THE APPARATUS

(75) Inventors: Chang-Hee Lee, Daejeon (KR); Je-Hee Park, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 1877 days.

(21) Appl. No.: 11/991,678

(22) PCT Filed: Sep. 6, 2006

(86) PCT No.: PCT/KR2006/003532
§ 371 (c)(1),
(2), (4) Date: Jun. 25, 2008

(87) PCT Pub. No.: WO2007/029962
PCT Pub. Date: Mar. 15, 2007

(65) Prior Publication Data
US 2009/0080880 A1     Mar. 26, 2009

(30) Foreign Application Priority Data

Sep. 7, 2005  (KR) .......................... 10-2005-0083256

(51) Int. Cl.
*H04B 10/071* (2013.01)
*H04J 14/02* (2006.01)

(52) U.S. Cl.
CPC ............... *H04B 10/071* (2013.01); *H04J 14/02* (2013.01); *H04J 14/0282* (2013.01); *H04J 14/0287* (2013.01)

(58) Field of Classification Search
USPC .................................................. 398/13, 14, 16
See application file for complete search history.

(56) References Cited

U.S. PATENT DOCUMENTS

| | | | |
|---|---|---|---|
| 4,341,438 | A | 7/1982 | Seki et al. |
| 4,563,087 | A | 1/1986 | Bourbin et al. |
| 4,912,526 | A | 3/1990 | Iwaoka et al. |
| 4,947,134 | A | 8/1990 | Olsson |
| 5,064,263 | A | 11/1991 | Stein |
| 5,117,303 | A | 5/1992 | Desurvire et al. |
| 5,202,780 | A | 4/1993 | Fussanger |
| 5,221,983 | A | 6/1993 | Wagner |

(Continued)

FOREIGN PATENT DOCUMENTS

| | | |
|---|---|---|
| EP | 0 060 033 A | 9/1982 |
| EP | 0 607 029 A | 7/1994 |

(Continued)

OTHER PUBLICATIONS

J. Baik et al., "Wavelength Self-Managed Optical WDM Source Using Polarization-Multiplexed Fabry-Pérot Laser Diodes", IEEE Photonics Technology Letters, vol. 16, No. 10, Oct. 2004.*

(Continued)

*Primary Examiner* — Shi K Li
(74) *Attorney, Agent, or Firm* — Blakely, Sokoloff, Taylor & Zafman LLP (57) ABSTRACT

Disclosed is an apparatus for monitoring failure positions on fibers in a WDM-PON system and a WDM-PON system having the apparatus.

20 Claims, 7 Drawing Sheets

(56) References Cited

U.S. PATENT DOCUMENTS

| | | |
|---|---|---|
| 5,251,001 A | 10/1993 | Dave et al. |
| 5,251,054 A | 10/1993 | Lynn |
| 5,276,543 A | 1/1994 | Olshansky |
| 5,307,366 A | 4/1994 | Auffret et al. |
| 5,321,541 A | 6/1994 | Cohen |
| 5,347,525 A | 9/1994 | Faris |
| 5,379,309 A | 1/1995 | Logan, Jr. et al. |
| 5,408,349 A | 4/1995 | Tsushima et al. |
| 5,412,673 A | 5/1995 | Caprara et al. |
| 5,418,183 A | 5/1995 | Joyner et al. |
| 5,434,662 A | 7/1995 | Rockwell et al. |
| 5,436,760 A | 7/1995 | Nakabayashi |
| 5,440,417 A | 8/1995 | Chung et al. |
| 5,491,573 A * | 2/1996 | Shipley .......................... 398/13 |
| 5,550,666 A | 8/1996 | Zirngibl |
| 5,589,970 A | 12/1996 | Lyu et al. |
| 5,600,471 A | 2/1997 | Hirohashi et al. |
| 5,625,478 A | 4/1997 | Doerr et al. |
| 5,646,774 A | 7/1997 | Takara et al. |
| 5,661,585 A | 8/1997 | Feldman et al. |
| 5,694,234 A | 12/1997 | Darcie et al. |
| 5,717,795 A | 2/1998 | Sharma et al. |
| 5,773,345 A | 6/1998 | Ota |
| 5,793,512 A | 8/1998 | Ryu |
| 5,796,502 A | 8/1998 | Haller, Jr. |
| 5,812,572 A | 9/1998 | King et al. |
| 5,835,517 A | 11/1998 | Jayaraman et al. |
| 5,841,557 A | 11/1998 | Otsuka et al. |
| 5,864,414 A | 1/1999 | Barnsley et al. |
| 5,880,865 A | 3/1999 | Lu et al. |
| 5,894,247 A | 4/1999 | Yoshida et al. |
| 5,907,417 A | 5/1999 | Darcie et al. |
| 5,920,414 A | 7/1999 | Miyachi et al. |
| 5,936,752 A | 8/1999 | Bishop et al. |
| RE36,471 E * | 12/1999 | Cohen .......................... 359/127 |
| 6,034,799 A | 3/2000 | Hansen |
| 6,081,355 A | 6/2000 | Sharma et al. |
| 6,097,523 A | 8/2000 | Boot |
| 6,120,190 A | 9/2000 | Mirman et al. |
| 6,134,037 A | 10/2000 | Shabeer et al. |
| 6,134,250 A | 10/2000 | Koren et al. |
| 6,137,611 A | 10/2000 | Boivin et al. |
| 6,178,001 B1 | 1/2001 | Kim |
| 6,192,170 B1 | 2/2001 | Komatsu |
| 6,195,200 B1 | 2/2001 | DeMarco et al. |
| 6,304,350 B1 | 10/2001 | Doerr et al. |
| 6,307,668 B1 | 10/2001 | Bastien et al. |
| 6,310,720 B1 | 10/2001 | Walker et al. |
| 6,323,994 B1 | 11/2001 | Li et al. |
| 6,437,907 B1 | 8/2002 | Yoon et al. |
| 6,469,649 B1 | 10/2002 | Helkey et al. |
| 6,470,036 B1 | 10/2002 | Bailey et al. |
| 6,498,869 B1 | 12/2002 | Yao |
| 6,498,871 B1 | 12/2002 | Kuboki |
| 6,597,482 B1 | 7/2003 | Chung et al. |
| 6,600,760 B1 | 7/2003 | Green et al. |
| 6,603,599 B1 | 8/2003 | Wang et al. |
| 6,650,840 B2 | 11/2003 | Feldman |
| 6,654,401 B2 | 11/2003 | Vieira et al. |
| 6,674,969 B1 | 1/2004 | Ogusu |
| 6,711,313 B2 | 3/2004 | Takiguchi et al. |
| 6,771,358 B1 * | 8/2004 | Shigehara et al. ........... 356/73.1 |
| 6,868,200 B2 | 3/2005 | Kimotsuki et al. |
| 6,868,236 B2 | 3/2005 | Wiltsey et al. |
| 6,888,856 B2 | 5/2005 | Green et al. |
| 6,941,074 B2 | 9/2005 | Nakamura et al. |
| 7,006,719 B2 | 2/2006 | Joyner et al. |
| 7,075,712 B2 | 7/2006 | Kinoshita et al. |
| 7,092,595 B2 | 8/2006 | Sorin et al. |
| 7,106,974 B2 | 9/2006 | Lee et al. |
| 7,171,123 B2 | 1/2007 | Lee et al. |
| 7,254,344 B2 | 8/2007 | Kim et al. |
| 7,313,157 B2 | 12/2007 | Sorin et al. |
| 7,327,957 B2 | 2/2008 | Lee et al. |
| 7,349,631 B2 | 3/2008 | Lee et al. |
| 7,403,718 B2 | 7/2008 | Matthews et al. |
| 7,415,205 B2 | 8/2008 | Shin et al. |
| 7,613,998 B2 | 11/2009 | Lee et al. |
| 7,627,246 B2 * | 12/2009 | Sorin et al. ...................... 398/63 |
| 2001/0004290 A1 * | 6/2001 | Lee et al. ...................... 359/124 |
| 2001/0013962 A1 | 8/2001 | Li et al. |
| 2001/0046364 A1 | 11/2001 | Ajima et al. |
| 2002/0039465 A1 | 4/2002 | Skinner |
| 2002/0067526 A1 | 6/2002 | Park et al. |
| 2002/0068859 A1 | 6/2002 | Knopp |
| 2002/0071173 A1 | 6/2002 | Lee et al. |
| 2002/0097768 A1 | 7/2002 | Thornton |
| 2002/0126345 A1 | 9/2002 | Chapman et al. |
| 2002/0196491 A1 | 12/2002 | Deng et al. |
| 2003/0007207 A1 | 1/2003 | Healey et al. |
| 2003/0039010 A1 | 2/2003 | Akimoto et al. |
| 2003/0058500 A1 | 3/2003 | Sugawara |
| 2003/0076560 A1 | 4/2003 | Pratt et al. |
| 2003/0095736 A1 | 5/2003 | Kish, Jr. et al. |
| 2003/0128917 A1 | 7/2003 | Turpin et al. |
| 2003/0142978 A1 | 7/2003 | Lee et al. |
| 2003/0165006 A1 | 9/2003 | Stephens et al. |
| 2003/0205706 A1 | 11/2003 | Lin et al. |
| 2003/0206740 A1 | 11/2003 | Lee et al. |
| 2003/0223672 A1 | 12/2003 | Joyner et al. |
| 2003/0223761 A1 | 12/2003 | Brown et al. |
| 2004/0033004 A1 | 2/2004 | Welch et al. |
| 2004/0033076 A1 | 2/2004 | Song et al. |
| 2004/0067059 A1 | 4/2004 | Song et al. |
| 2004/0131358 A1 | 7/2004 | Jung et al. |
| 2004/0136716 A1 | 7/2004 | Jung et al. |
| 2004/0175188 A1 | 9/2004 | Bellemare et al. |
| 2004/0184805 A1 | 9/2004 | Shin et al. |
| 2004/0184806 A1 | 9/2004 | Lee et al. |
| 2004/0208208 A1 | 10/2004 | Shin et al. |
| 2004/0264400 A1 | 12/2004 | Lee et al. |
| 2005/0135449 A1 | 6/2005 | Sorin et al. |
| 2005/0147412 A1 | 7/2005 | Park et al. |
| 2005/0152696 A1 | 7/2005 | Shin et al. |
| 2005/0163503 A1 | 7/2005 | Lee et al. |
| 2005/0259989 A1 | 11/2005 | Sorin et al. |
| 2005/0286895 A1 | 12/2005 | Lee et al. |
| 2006/0002706 A1 | 1/2006 | Lee et al. |
| 2006/0045542 A1 | 3/2006 | Chu et al. |
| 2006/0093360 A1 | 5/2006 | Kim et al. |
| 2006/0262324 A1 | 11/2006 | Hays et al. |
| 2006/0263090 A1 | 11/2006 | Lee et al. |
| 2007/0014509 A1 | 1/2007 | Kish, Jr. et al. |
| 2007/0081823 A1 | 4/2007 | Lee et al. |
| 2007/0274729 A1 | 11/2007 | Lee et al. |
| 2008/0137698 A1 | 6/2008 | Sorin et al. |
| 2008/0232805 A1 | 9/2008 | Lee et al. |
| 2010/0221008 A1 | 9/2010 | Lee et al. |

FOREIGN PATENT DOCUMENTS

| | | |
|---|---|---|
| EP | 0 688 114 A | 12/1995 |
| EP | 0 844 706 A2 | 5/1998 |
| EP | 0 844 706 A3 | 2/1999 |
| EP | 0 972 367 A | 1/2000 |
| EP | 0 991 217 A2 | 4/2000 |
| EP | 1 024 541 A | 8/2000 |
| EP | 1 089 098 A | 4/2001 |
| EP | 1124296 | 8/2001 |
| EP | 1 195 867 A1 | 4/2002 |
| EP | 1 388 963 A2 | 2/2004 |
| EP | 1468515 | 10/2004 |
| GB | 2 122 371 A | 1/1984 |
| JP | 61-114624 | 6/1986 |
| JP | 02-261236 | 10/1990 |
| JP | 06-252860 | 9/1994 |
| JP | 8 -163097 | 6/1996 |
| JP | 09-233052 | 9/1997 |
| JP | 10-23478 | 1/1998 |
| JP | 11-211924 | 8/1999 |
| JP | 2000-174397 | 6/2000 |
| JP | 2000-196536 | 7/2000 |
| JP | 2000-292636 | 10/2000 |
| JP | 2001-127377 | 5/2001 |

(56) References Cited

FOREIGN PATENT DOCUMENTS

| | | |
|---|---|---|
| JP | 2001-188140 | 7/2001 |
| JP | 2001-203643 | 7/2001 |
| JP | 2001-230733 | 8/2001 |
| JP | 2001-257658 | 9/2001 |
| JP | 2001-356377 | 12/2001 |
| JP | 2002-141927 | 5/2002 |
| JP | 2002-270949 | 9/2002 |
| JP | 2002-374207 | 12/2002 |
| JP | 2003-14963 | 1/2003 |
| JP | 2003-17798 | 1/2003 |
| JP | 2003-69502 | 3/2003 |
| JP | 2003-124893 | 4/2003 |
| JP | 2003-124911 | 4/2003 |
| JP | 2003-134058 | 5/2003 |
| JP | 2004-159328 | 3/2004 |
| KR | 10-2000-009290 A | 2/2000 |
| KR | 00-33946 | 6/2000 |
| KR | 10-2000-0033946 A | 6/2000 |
| KR | 00-39036 | 7/2000 |
| KR | 10-2001-0063062 A | 7/2001 |
| KR | 01-93921 | 10/2001 |
| KR | 10-2002-0003318 | 1/2002 |
| KR | 0325687 | 2/2002 |
| KR | 10-2003-0063085 A | 7/2003 |
| KR | 10-2003-0065632 A | 8/2003 |
| KR | 10-2003-0086223 A | 11/2003 |
| KR | 10-2004-0023305 | 3/2004 |
| KR | 10-2004-0025304 A | 3/2004 |
| KR | 10-2004-0056828 A | 7/2004 |
| KR | 0454887 | 10/2004 |
| KR | 10-2004-0103085 A | 12/2004 |
| KR | 0496710 | 6/2005 |
| KR | 10-0515259 | 9/2005 |
| KR | 10-2006-0042486 A | 5/2006 |
| KR | 10-2007-0021122 | 2/2007 |
| KR | 10-0680815 | 2/2007 |
| WO | WO 97/49248 A1 | 12/1997 |
| WO | WO 98/32196 | 7/1998 |
| WO | WO 98/45974 A2 | 10/1998 |
| WO | WO 99/37002 A1 | 7/1999 |
| WO | WO 99/59010 A1 | 11/1999 |
| WO | WO 00/05788 | 2/2000 |
| WO | WO 00/10271 | 2/2000 |
| WO | WO 03/032547 A2 | 4/2003 |
| WO | WO 03/063401 A2 | 7/2003 |
| WO | WO 03/065621 A1 | 8/2003 |
| WO | WO 03/102659 | 12/2003 |
| WO | WO 03/107057 A1 | 12/2003 |
| WO | WO 2004/028047 A1 | 4/2004 |
| WO | WO 2004/034621 A2 * | 4/2004 ............ H04J 14/02 |
| WO | WO 2004/034621 A3 | 4/2004 |
| WO | WO 2004/047344 | 6/2004 |
| WO | WO 2004/059915 A1 | 7/2004 |
| WO | WO 2004/107628 A1 | 12/2004 |
| WO | WO 2005/069516 A1 | 7/2005 |
| WO | WO 2005/099148 A1 | 10/2005 |
| WO | WO 2006/005981 A1 | 1/2006 |
| WO | WO 2007/027042 A1 | 3/2007 |

OTHER PUBLICATIONS

PCT Notification of Transmittal of The International Search Report and the Written Opinion of the International Searching Authority or The Declaration for PCT Counterpart Application No. PCT/US2004/031407 Containing International Search Report (Feb. 9, 2005).
PCT Notification of Transmittal of The International Search Report and the Written Opinion of the International Searching Authority or The Declaration for PCT Counterpart Application No. PCT/US2007/012239 Containing International Search Report, 14 pgs. (Jan. 3, 2008).
PCT Invitation to Pay Additional Fees for PCT Counterpart Application No. PCT/US03/12054 Containing Communication Relating to the Results of the Partial International Search, 6 pgs. (Feb. 11, 2004).
PCT International Preliminary Report on Patentability dated Apr. 15, 2009 for International Application No. PCT/US2007/012239.
PCT Notification of Transmittal of International Search Report for PCT Counterpart Application No. PCT/US03/12054 Containing International Search Report, 9 pgs. (Mar. 31, 2004).
PCT Written Opinion for PCT Counterpart Application No. PCT/US03/12054, 6 pgs. (May 2, 2005).
Patent Cooperation Treaty's Written Opinion for Intenational Application No. PCT/US03/01782, 8 pgs. (Oct. 15, 2004).
PCT Notification of Transmittal of International Search Report for PCT Counterpart Application No. PCT/US03/01782 Containing International Search Report, 7 pgs. (Apr. 28, 2004).
PCT Notification of Transmittal of The International Search Report and the Written Opinion of the International Searching Authority or The Declaration for PCT Counterpart Application No. PCT/IB2004/002187 Containing International Search Report, 7 pgs. (Sep. 17, 2007).
PCT Notification of Transmittal of International Search Report for PCT Counterpart Application No. PCT/US03/12649 Containing International Search Report, 11 pgs. (Feb. 6, 2004).
PCT Written Opinion for PCT Counterpart Application No. PCT/US03/12649, 5 pgs. (Nov. 5, 2004).
McMahon, Donald H., et al."Echelon grating multiplexers for hierachically multiplexed fiber-optic communication networks,"Applied Optics, vol. 26, No. 11, pp. 2188-2196 (Jun. 1, 1987).
Jung, et al., "Spectrum-Sliced Bidirectional WDM PON," Optical Fiber Communication Conference, vol. 2, pp. WJ6-2 to WJ6-4 (2000).
PCT International Preliminary Examination Report for Counterpart International application No. PCT/US03/01782, dated May 18, 2005, 6 pgs.
PCT Notification of Transmittal of International Preliminary Examination Report for PCT Counterpart International application No. PCT/US03/12054, 7 pgs. (Jul. 21, 2005).
Zah, C., et al., "Amplifiers with Angled Facets, Fabrication and Performance of 1.5MUM GAINASP Traveling-Wave Laser," Electronics Letters, IEE Stevenage, GB, vol. 23, No. 19, Sep. 10, 1987, pp. 990-992, XP000710298, ISSN: 0013-5194.
Chang-Hasnain et al., "Integrated external cavity quantum well laser array using single eptaxial growth on a patterned substrate," Applied Physics Letters, Vo. 56, No. 5, Jan. 1990.
International Preliminary Report on Patentability dated Jun. 29, 2006 for PCT/US2004/031407 filed Sep. 23, 2004.
Zirngibl, M., et al., "An 18-Channel Mulitfrequency Laser," IEEE Photonics Technology Letters, vol. 9, No. 7, Jul. 1996, pp. 870-872 (3 pages).
Zirngibl, M., et al., "Study of Spectal Slicing for Local Access Applications," IEEE Photonics Technology Letters, vol. 8, No. 5, pp. 721-723 (May 1996).
Woodward, S.L.,et al., "A Spectrally Sliced PON Employing Fabry-Perot Lasers," IEEE Photonics Technology Letters, vol. 10, No. 9, pp. 1337-1339 (Sep. 1998).
Iwashita, Katsushi, et al., "Suppression of Mode Partition Noise by Laser Diode Light Injections," IEEE Journal of Quantum Electronics, vol. QE-18, No. 10, pp. 1669-1674 (Oct. 1982).
Feuer, M.D., et al., "Singe-Port Laser-Amplifier Modulators for Local Access,"IEEE Photonics Technology Letters, vol. 8, No. 9, pp. 1175-1177 (Sep. 1996).
Haruna, Masamitsu, et al., "Optical Waveguide Power Distributor and Multichannel Modulator and Demodulator," Piezo-Electricity and Acousto-optic, No. 4 of 1983, pp. 5867, Apr. 1983.
Jinshan, Xie, "Application of Wavelength Division Muliitplexing (WDM) Technology in Passive Optical Network," Development of Laser and Optocelectronics (Supplement), No. 9 of 1999, pp. 67-70, Sep. 1999.
Youlong, Yu, et al., "Study on a Novel High Power Broadband Light Source," Chinese Journal of Lasers, vol. A28, No. 1, pp. 71-73, Jan. 2001.
Yunfeng, Shen, et al., "The Research on Layering Structure and Network Management of Photonic Transport Networks," Journal of China Institute of Communications, vol. 19, No. 7, pp. 18-24, Jul. 1998.

(56) References Cited

OTHER PUBLICATIONS

Presby, H.M., et al., "Amplified integrated star couplers with zero loss," Photonics Technology Letters, IEEE vol. 3, Issue 8, Aug 1991, pp. 724-726.

Shin, et al., "155 Mbit/s TrasmissionUsing ASE-Injected Fabry-Perot Laser Diode in WDM-PON over 70 0C Temperature Rage," Electronics Letters, Sep. 4, 2003, vol. 39, No. 18, pp. 1331-1332.

Choi, K.M., "Broadband Light Source by Mutually Injected FP-LD's" OECC/COIN 2004, Jan. 1, 2004, pp. 882-884, XP009126452.

PCT International Search Report for PCT/KR2005/003767, mailed Feb. 17, 2006, 2 pages.

PCT Written Opinion for PCT/KR2005/003767, mailed Feb. 17, 2006, 3 pages.

Jin, Xiaomin, et al., "Bandwidth enhancement of Fabry-Perot quantum-well lasers by injection-locking" Jun. 12, 2006, Solid-State Electronics, p. 1141-9.

Takachio, N., et al., "Wide Area Gigabit Access Network based on 12.5GHz Spaced 256 Channel Super-Dense WDM Technologies", Electronic Letters, vol. 35, No. 5, XP6016306, 2 pgs., (Mar. 1, 2001).

Hyun Deok Kim, et al., "A Low-Cost WDM Source with an ASE Injected Fabry-Perot Semiconductor Laser," XP000968561, IEEE Photonics Technology Letters, vol. 12, No. 8, pp. 1067-1069 (Aug. 2000).

Robert D. Feldman, et al., "An Evaluation of Architectures Incorporating Wavelength Division Multiplexing for Broad-Band Fiber Access," Journal of Lightwave Technologies, vol. 16, No. 9, pp. 1546-1559 (Sep. 1998).

H. Takahashi, et al., "Transmission characteristics of arrayed-waveguide NxN wavelenth multiplexer," IEEE Photonic Technology Letters, vol. 13, No. 3, pp. 447-455 (Mar. 1995).

International Telecommunication Union (ITU), ITU-T, G.983.1. Series G: Transmission Systems and Media Digital Systems and Networks, Digital transmission systems—Digital sections and digital line system—Optical line systems for local and access networks, Broadband optical access systems based on Passive Optical Networks (PON) (Oct. 1998).

J. Heanue et al., "Widely Tunable Laser Module using DFB Array and MEMS Selection with Internal Wavelength Locker", OFC 2003/ vol. 1, pp. 82-83.

B. Pezeshki et al., "12 Element Multi-wavelength DFB Arrays for Widely Tunable Laser Modules", OFC 2002, pp. 711-712.

Jae-Sung Lee, "Signal-to-Noise Ratio Measurement of a 2.5-Gb/s Spectrum-Sliced Incoherent Light Channel," IEEE Photonics Technology Letters, vol. 9, No. 1, pp. 94-96 (Jan. 1997).

L.Y. Chan, et al., "Upstream traffic transmitter using injection-locked Fabry-Perot laser diode as modulator for WDM access networks," XP006017703, Electronic Letters, vol. 38, No. 1, pp. 43-45 (Jan. 3, 2002).

Dong Jae Shin, et al., "Hybrid WDM/TDM-PON with Wavelength-Selection-Free Transmitters," Journal of Lightwave Technology, vol. 23, No. 1, pp. 187-195 (Jan. 2005).

E. Wong, et al., "Low-cost WDM passive optical network with directly-modulated self-seeding reflective SOA," Electronics Letters, vol. 42, No. 5, 2 pages (Mar. 2, 2006).

Wai Hung, et al., "An Optical Network Unit for WDM Access Networks with Downstream DPSK and Upstream remodulated OOK Data Using Injection-Locked FP Laser," IEEE Photonics Technology Letters, vol. 15, No. 10, pp. 1476-1478 (Oct. 10, 2003).

Derek Mayweather, et al., "Wavelength Tracking of a Remote WDM Router in a Passive Optical Network," XP000624886, IEEE Photonics Technology Letters, vol. 8, No. 9, pp. 1238-1240 (Sep. 1, 1996).

Database WPI, Section E1, Week 200111, Derwent Publications ltd., London, GB, AN 2001-098850, XP002276043.

D.K. Jung, et al., "Wavelength-Division-Multiplexed Passive Optical Network Based on Sprectrum-Slicing Techniques," IEEE Photonics Technology Letters, vol. 10, No. 9, pp. 1334-1336 (Sep. 1998).

J.S. Lee, et al., "Sprectrum-Sliced Fiber Amplifier Light Source for Multichannel WDM Applications," IEEE Photonics Technology Letters, vol. 5, No. 12, pp. 1458-1461 (Dec. 1993).

P. Healey, et al., "Spectral Slicing WDM-PON Using Wavelength-Seeded Reflective SOAs," Electronics Letters, vol. 37, No. 19, pp. 1181-1182 (Sep. 13, 2001).

Qiao Yaojun, et al., "A New Scheme for WDM-Based Passive Optical Access Network," 4 pgs. (2000).

S.V. Kartalopoulos, Introduction to DWDM Technology: Data in a Rainbow, pp. 56-57 (2000).

K. Petermann, "Laser Diode Modulation and Noise," Noise Characteristics of Solitary Laser Diodes, Section 7.3.2 Mode partition noise pp. 163-166 (1991).

Tae-Won Oh, et al., "Broadband Light Source for Wavelength-Division Multiple Access Passive Optical Network," Dept. of Electrical Engineering, Korea Advanced Institute of Science and Technology and Novera Optics Korea, Inc.

D.D. Sampson, et al., "100mW Sprectrally-Uniform Broadband ASE Source for Sprectrum-Sliced WDM Systems," XP006001052, Electronics Letters, vol. 30, No. 19, pp. 1611-1612 (Sep. 15, 1994).

Kikuchi, Kazuro "Effect of 1/f-Type FM Noise on Semiconductor-Laser Linewidth Residual in High-Power Limit", IEEE Journal of Quantum Electronics, vol. 25, No. 4, Apr. 1989, pp. 684-688.

Kurtz, Russell M., et al., "Mutual Injection Locking: A New Architecture for High-Power Solid-State Laser Arrays", May/Jun. 2005, IEEE Journal of Selected Topics in Quantum Electronics, vol. 11, No. 3, pp. 578-586.

European Search Report for EP 10181262.6-2415, mailed Nov. 8, 2010, 7 pages.

Korean Office Action for KR Patent Application No. 10-2006-7014412, mailed Dec. 16, 2010, 3 pgs.

\* cited by examiner

APPARATUS FOR MONITORING FAILURE POSITIONS IN WAVELENGTH DIVISION MULTIPLEXING-PASSIVE OPTICAL NETWORKS AND WAVELENGTH DIVISION MULTIPLEXING-PASSIVE OPTICAL NETWORK SYSTEMS HAVING THE APPARATUS

CROSS REFERENCE TO RELATED APPLICATION:

This patent application is a U.S. National Phase application under 35 U.S.C. §371 of International Application No. PCT/KR2006/003532, filed on 6 Sep. 2006, entitled APPARATUS FOR MONITORING FAILURE POSITIONS IN WAVELENGTH DIVISION MULTIPLEXING-PASSIVE OPTICAL NETWORKS AND WAVELENGTH DIVISION MULTIPLEXING-PASSIVE OPTICAL NETWORK SYSTEMS HAVING THE APPARATUS.

TECHNICAL FIELD

The present invention relates to an apparatus for monitoring failure positions on optical fibers (hereinafter, referred to as fibers) in a wavelength division multiplexing-passive optical network (hereinafter, referred to as WDM-PON) and a WDM-PON having the apparatus. More particularly, the present invention relates to an apparatus for monitoring failure positions on fibers in a WDM-PON system by injecting pulse-type monitoring light into the fibers and measuring the intensity of reflected light and backscattering, as well as a WDM-PON system having the apparatus.

BACKGROUND ART

Recently, research and development of WDM-PONs is vigorously conducted so as to increase the capacity of networks and improve the transmission rate. In particular, WDM-PONs are regarded as best suited to accommodate video/image-based services. In order to implement WDM-PONs economically, it has recently been proposed to use an F-P LD (Fabry-Perot Laser Diode), which is wavelength-locked by the injected incoherent ASE (Amplified Spontaneous Emission) light from outside, as a light source of WDM-PONs. However, when a fiber fails unexpectedly in any type of WDM-PON system, the failure must be quickly grasped so as to restore the system, or the reliability of services provided to ONTs (Optical Network Terminations) is seriously degraded.

In order to monitor failure positions on fibers, an OTDR (Optical Time Domain Reflectometry) is generally used. This device is operated in the following manner: it injects pulse-type monitoring light, which has a short time width, into fibers and receives light backscattered by fine impurities inside the fibers. The OTDR then receives light reflected by connection units, particularly optical devices including a coupler, a connector, an AWG (Arrayed Waveguide Grating), and a WDM, by using a photo detector having good sensitivity. The intensity of received light is given as a function of distance. When the injected monitoring light propagates through the fibers, a small amount of the light is backscattered, but it undergoes a large degree of reflection where a failure has occurred. Therefore, the time-based function of received backscattered light becomes discontinuous due to reflected waves at a specific point of time, and the distance (position) of the failure is known by associating the point of time with the speed of light inside the fibers.

However, there are a number of difficulties in applying the above-mentioned method for monitoring failure positions to a WDM-PON system. As known in the art, different wavelengths are used from a remote node to respective ONTs. If a specific distributed fiber has failed, different wavelengths of monitoring light needs to be used to monitor the failure positions. A wavelength-tunable light source may be used to this end, but it is economically unfavorable.

In an attempt to solve the problems occurring when a wavelength-tunable light source is used, it has been proposed to use a DFB LD (Distributed Feedback Laser Diode) as a conventional light source for signal transmission and, when a failure has occurred, identify a faulty channel by means of a receiver of a CO (Central Office), so that the faulty channel's DFB LD for signal transmission is used as a monitoring light source. However, this approach is not economical because expensive DFB LDs are used. Furthermore, a switch for toggling between transmission mode and monitoring mode is necessary for each channel. The resulting increase in channels renders the transmission unit complicated.

DISCLOSURE OF THE INVENTION

Therefore, the present invention has been made in view of the above-mentioned problems, and it is an object of the present invention to provide a method for economically monitoring failure positions on all fibers, including distributed fibers, without using expensive wavelength-tunable light sources in a WDM-PON system while maintaining transmission via channels with no failure.

According to an aspect of the present invention, there is provided a failure position monitoring apparatus for a WDM-PON system having a feeder fiber, a plurality of distributed fibers, a plurality of transmitters for transmitting an information signal between a CO and a plurality of ONTs via a fiber, and a plurality of receivers for receiving the information signal, the apparatus including a signal generator for generating a monitoring electric pulse signal for monitoring a failure positions on the fiber; a light source modulated by the signal generator so as to convert the pulse signal into monitoring light and output the monitoring light; a tunable band pass filter for passing only a predetermined wavelength range while tuning a wavelength; an N-BLS for outputting light to be injected into the light source; a four-port optical circulator for routing the incoherent ASE light so as to be inputted to the light source via the tunable band pass filter, the incoherent ASE light having been outputted by the N-BLS, the four-port optical circulator routing the monitoring light to the feeder fiber, the monitoring having been outputted by the light source and having passed through the tunable band pass filter; a photo detector for receiving the monitoring light routed by the four-port optical circulator, the monitoring light having been backscattered and reflected on the fiber, the photo detector converting the monitoring light into an electric signal and outputting the electric signal; a signal processing unit for reducing noise from the monitoring light converted and outputted by the photo detector, the signal processing unit outputting the monitoring light; and a display unit for displaying an optical output graph based on a distance outputted by the signal processing unit.

According to another aspect of the present invention, there is provided a failure position monitoring apparatus for a WDM-PON system having a feeder fiber, a plurality of distributed fibers, a plurality of transmitters for transmitting an information signal between a CO and a plurality of ONTs via a fiber, a plurality of receivers for receiving the information signal, an A-BLS, and a B-BLS, the A-BLS and the B-BLS injecting light from outside so that transmission light sources inside the transmitters oscillate in a quasi-single mode, respectively, the apparatus including a tunable band pass filter for passing only a predetermined wavelength range while tuning a wavelength; a first three-port optical circulator for routing a portion of the incoherent ASE light to the tunable band pass filter, the incoherent ASE light having been outputted by the A-BLS; a signal generator for generating a monitoring electric pulse signal for monitoring a failure positions on the fiber; a light source modulated by the signal generator, the light source outputting wavelength-locked monitoring light; a second three-port optical circulator for inputting the incoherent ASE light into the light source, the incoherent ASE light having routed through the tunable band pass filter, the second three-port optical circulator routing the monitoring light outputted by the light source, the second three-port optical circulator routing the monitoring light to the tunable band pass filter, the monitoring light having been backscattered and reflected on the feeder; a control device electrically connected to the receivers of the CO, the control device identifying a faulty channel, controlling the tunable band pass filter, and driving the signal generator; a photo detector for receiving the monitoring light backscattered and reflected, the monitoring having routed through the second three-port optical circulator, the tunable band pass filter, and the first three-port optical circulator successively, the photo detector converting the monitoring light into an electric signal; a signal processing unit for reducing noise from the electric signal outputted by the photo detector, the signal processing unit determining a failure position; and a display unit for displaying the failure position determined by the signal processing unit.

According to another aspect of the present invention, there is provided a failure position monitoring apparatus for a WDM-PON system having a feeder fiber, a plurality of distributed fibers, a plurality of transmitters for transmitting an information signal between a CO and a plurality of ONTs via a fiber, and a plurality of receivers for receiving the information signal, the apparatus including a signal generator for generating a monitoring electric pulse signal for monitoring a failure positions on the fiber; a light source modulated by the signal generator so as to convert the pulse signal into monitoring light and output the monitoring light; a tunable band pass filter for passing only a predetermined wavelength range while tuning a wavelength; an optical amplifier for amplifying the monitoring light filtered by the tunable band pass filter; a three-port optical circulator for routing the monitoring light to the feeder fiber, the monitoring light having been amplified by the optical amplifier, the three-port optical circulator receiving the monitoring light backscattered and reflected on the fiber, the three-port optical circulator passing and outputting the monitoring light; a photo detector for receiving the monitoring light backscattered and reflected, the monitoring light having been routed and outputted by the three-port optical circulator, the photo detector converting the monitoring light into an electric signal and outputting the electric signal; a signal processing unit for reducing noise from the electric signal outputted by the photo detector and outputting the electric signal; and a display unit for displaying a failure position determined by the signal processing unit.

According to another aspect of the present invention, there is provided a failure position monitoring apparatus for a WDM-PON system having a plurality of transmitters for transmitting an information signal between a CO and a plurality of ONTs via a fiber, the fiber having a feeder fiber and a distributed fiber for a plurality of channels, and a plurality of receivers for receiving the information signal, the apparatus including a signal generator for generating an electric pulse signal for monitoring a failure positions on the fiber; a high-power laser for outputting monitoring light modulated by the signal generator; a tunable band pass filter for filtering modulated high-output monitoring light so as to coincide a wavelength corresponding to a faulty channel, the high-output monitoring light having been outputted by the high-power laser, the tunable band pass filter outputting the high-output monitoring light to the fiber; a three-port optical circulator for routing the high-output monitoring light to the feeder fiber, the high-output monitoring light having passed through the tunable band pass filter, the three-port optical circulator receiving the monitoring light backscattered and reflected on the fiber, the three-port optical circulator routing and outputting the monitoring light; a photo detector for receiving the monitoring light backscattered and reflected, the monitoring light having been routed and outputted by the three-port optical circulator, the photo detector converting the monitoring light into an electric signal and outputting the electric signal; a signal processing unit for reducing noise from the electric signal outputted by the photo detector and outputting the electric signal; and a display unit for displaying a failure position determined by the signal processing unit.

The present invention is advantageous in that it can monitor the failure positions on channels in a WDM-PON system while maintaining transmission via other channels, as well as check if other channels are functioning normally in an economic manner. Therefore, any failure in the WDM-PON system is accurately positioned for fast recovery. This reduces the cost for repair and maintenance and improves the reliability of the WDM-PON system.

BRIEF DESCRIPTION OF THE DRAWINGS

The foregoing and other objects, features and advantages of the present invention will become more apparent from the following detailed description when taken in conjunction with the accompanying drawings in which.

BEST MODE FOR CARRYING OUT THE INVENTION

Reference will now be made in detail to the preferred embodiments of the present invention.

In order to solve the above-mentioned problems occurring in the prior art, the present invention proposes three novel approaches: 1) using an N-BLS (New wavelength range Broadband Light Source), which has a band different from transmission signal bands, 2) using a BLS used for injection into a data transmission light source, i.e. the same BLS as the transmission signal band, and 3) using no BLS.

Embodiment 1

Figure 1:
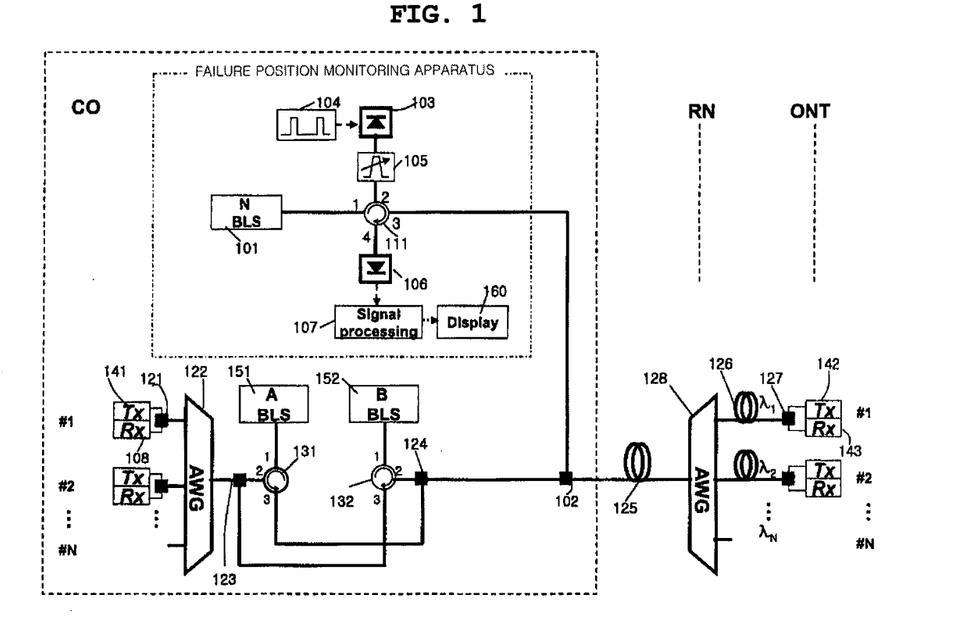
FIG. 1 shows an apparatus for monitoring failure positions on fibers by using an N-BLS and a WDM-PON system having the apparatus according to Embodiment 1 of the present invention.
Figure 2:
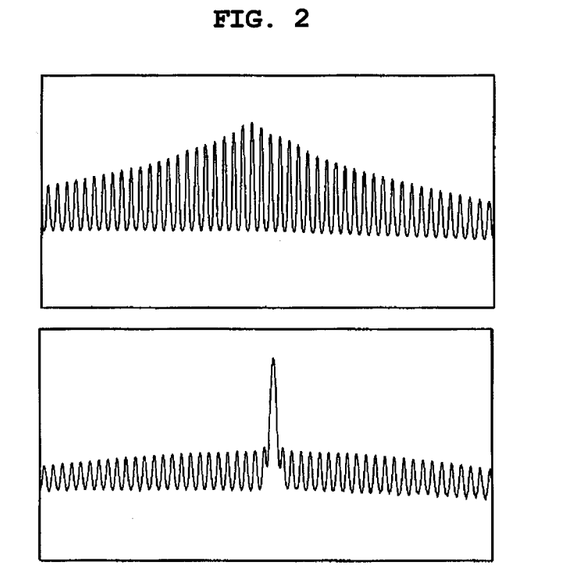
FIG. 2 shows a multi-mode spectrum of an F-P LD and a quasi-single mode spectrum after wavelength-locking resulting from injection of light from a BLS.

FIG. 1 shows an apparatus for monitoring failure positions on fibers by using an N-BLS and a WDM-PON system having the apparatus according to Embodiment 1 of the present invention, and FIG. 2 shows a multi-mode spectrum of an F-P LD and a quasi-single mode spectrum after wavelength-locking resulting from injection of light from a BLS.

An apparatus for monitoring failure positions on fibers and a WDM-PON system having the apparatus according to Embodiment 1 of the present invention will now be described with reference to FIGS. 1 and 2. Although an inexpensive F-P LD is used as a light source for data transmission, it cannot be used as a light source for a WDM (Wavelength Division Multiplexing), because, in terms of wavelength range, it oscillates in a multi-mode as shown in the upper half of FIG. 2. However, when the incoherent ASE light outputted from a BLS is injected into the F-P LD via AWGs 122 and 128, light having a wavelength determined for each port of the AWGs 122 and 128 is injected to an F-P LD in each transmitter 141 and 142. The transmitters 141 and 142 have an F-P LD adapted to receive light injected from an external BLS and oscillate in a quasi-single mode as shown in the lower half of FIG. 2, as well as a modulation circuit (not shown). The transmitters 141 and 142 transmit information signals between a CO and a plurality of ONTs. The transmitters 141 and 142 modulate desired information signals and transmit them to the F-P LD, which oscillates in a quasi-single mode, so as to enable communication between the CO and the ONTs. Receivers 108 and 143 have a photo detector for receiving transmitted light and converting it into an electric signal, as well as an amplification/decision circuit (not shown). The receivers 108 and 143 receive information signals between the CO and the ONTs. Those skilled in the art can easily understand that the same construction and function of the transmitters 141 and 142 and the receivers 108 and 143 apply to other embodiments shown in FIGS. 4 to 11. In addition, although the present invention is described with reference to transmitters having F-P LDs, the present invention is applicable to any type of WDM-PON having different transmitters and receivers.

Transmission of optical signals via downlink (CO respective ONTs) will now be described. Light outputted from an A-BLS 151 of the CO is inputted to port no. 1 of a three-port optical circulator 131 and outputted via port no. 2. After passing through a WDM 123, an AWG 122, and a WDM 121, the light is injected into an F-P LD inside the transmitter 141 of respective channels $\lambda_1, \lambda_2 \ldots \lambda_N$. For clarity of description, transmitters and receivers will be described hereinafter with reference to only one channel $\lambda_1$. The transmitter 141 modulates desired information signals and loads them onto an F-P LD, which oscillates in a quasi-single mode. The transmitter 141 transmits the signals to the AWG 122 via the WDM 121. Then, the AWG 122 multiplexes optical signals of various channels $\lambda_1, \lambda_2 \ldots \lambda_N$. The multiplexed light is inputted to port no. 2 of the three-port optical circulator 131 via the WDM 123 and transmitted to the WDM 124. Then, the light is transmitted from the WDM 124 to an RN (Remote Node) via a feeder fiber 125. In this case, a channel spacing between the channels $\lambda_1, \lambda_2 \ldots \lambda_N$ is defined as the interval of wavelengths allocated to respective channels by the AWG. For example, the channel spacing may be 50 GHz (0.4 nm), 100 GHz (0.8 nm), or 200 GHz (1.6 nm). The AWG 128 of the RN demultiplexes received optical signals into various wavelengths and transmits them to respective ONTs via distributed fibers 126. After reaching each ONT, the optical signals are transmitted towards only the receiver 143 by the WDM 127, so that respective ONTs obtain necessary information.

According to Embodiment 1 of the present invention, the F-P LD (not shown) inside each transmitter 141 and 142 is a laser diode having an anti-reflection coating or a coating having a front facet reflectivity of 0-33%, and the photo detector inside each receiver 108 and 143 is a PIN-PD (Positive-Intrinsic-Negative Photo Diode). The BLSs 151 and 152 may be implemented by using one of an LED, an SLD, and an EDFA (Erbium-Doped Fiber Amplifier). Furthermore, the BLSs 151 and 152 may use a wavelength band selected, from O, E, S, C, L, and U bands, which are proposed by ITU (International Telecommunications Union). Preferably, the feeder fiber 125 and the distributed fiber 126 use single-mode fibers, respectively. These details of the F-P LD, the BLSs 151 and 152, the feeder fiber 125, and the distributed fiber 126 according to Embodiment 1 equally apply to other embodiments shown in FIGS. 4 to 11.

Transmission of optical signals from the ONTs to the CO via uplink is substantially identical to the above-mentioned transmission via downlink. In particular, light outputted from a B-BLS 152 routes through the three-port optical circulator 132, the WDM 124, the feeder fiber 125, the AWG 128, the distributed feeder 126, and the WDM 127 and is injected into the F-P LD of the ONT-side transmitter 142.

The transmitter 142 modulates desired information signals and loads them onto the F-P LD, which oscillates in a quasi-single mode. The signals successively pass through the WDM 127, the distributed feeder 126, the AWG 128, and the feeder fiber 125 and are inputted to the three-port optical circulator 132 via the WDM 124. Particularly, the light is inputted to port no. 2 of the three-port optical circulator 132 and outputted via port no. 3. Then, the light passes through the WDM 123, the AWG 122, and the WDM 121 and is inputted to the receiver 108 of the CO.

If any of the feeders 125 and 126 is broken or has a different type of failure while the WDM-PON system according to Embodiment 1 of the present invention is functioning normally, light received by the receiver 108 of the CO becomes very weak, and so do electrical signals converted therefrom. In order to monitor failure position on the feeders 125 and 126, the apparatus for monitoring failure positions according to Embodiment 1 of the present invention transmits monitoring optical signals to the feeders 125 and 126 via a CWDM (Coarse Wavelength Division Multiplexing) 102. More particularly, the apparatus for monitoring failure positions according to the present invention includes a signal generator 104 for generating monitoring electric pulse signals, which are used to monitor failure positions on feeders; a light source 103 modulated by the signal generator 104 so as to convert the pulse signals into monitoring light and output the light; a tunable band pass filter 105 for passing only a predetermined wavelength range while tuning the wavelength; an N-BLS 101 for outputting light to be injected into the light source 103; a four-port optical circulator 111 for routing the incoherent ASE light, which is outputted by the N-BLS 101, to the light source 103 via the tunable band pass filter 105 and routing monitoring light, which is outputted by the light source 103 and passes through the tunable band pass filter 105, to the feeders 125 and 126; a photo detector 106 for receiving the monitoring light, which is routed by the four-port optical circulator 111 and which is backscattered and reflected on the feeders 125 and 126, converting the received monitoring light into electric signals, and outputting them; a signal processing unit 107 for reducing noise from the converted electric signals, which have been outputted by the photo detector 106, and outputting them; and a display unit 160 for displaying failure positions based on the result of failure positioning by the signal processing unit 107.

Light outputted by the N-BLS 101 is routed by the four-port optical circulator 111. After passing through the tunable band pass filter 105, the light has a smaller bandwidth. The light is injected into the light source 103, which then oscillates in a quasi-single mode as shown in the lower half of FIG. 2 and which is modulated by the signal generator 104. The monitoring light outputted by the light source 103 passes through the tunable band pass filter 105, so that adjacent mode components of the light are further filtered. In this case, the tunable band pass filter 105 may be adjusted so as to coincide a wavelengths corresponding to channels numbered 1 to N $\lambda_1, \lambda_2 \ldots \lambda_N$, in order to obtain a monitoring light waveform having wavelengths corresponding to respective channels. As such, the present invention is advantageous in that a monitoring light waveform measured in the case of a failure is compared with that measured in the case of no failure, so that every channel is subjected to fault checking. In other words, not only faulty channels, but also normally functioning channels are always monitored.

After being inputted to the feeder fiber 125 via the four-port optical circulator 111 and the CWDM 102, the monitoring light routes through the feeders 125 and 126 and undergoes backscattering and reflection. Then, the light is received by the photo detector 106 via the CWDM 102 and the four-port optical circulator 111. The received light is converted into electric signals, which pass through the signal processing unit 107 for noise reduction and which are displayed by the display unit 160.

The light source 103, which oscillates in a quasi-single mode, has suppressed adjacent modes as shown in the lower half of FIG. 2. Therefore, even when the power of a single mode may be small, a number of modes existing over a wide wavelength range may be combined and generate higher power. Backscattered and reflected waves resulting from the adjacent modes may act as noise with regard to backscattered and reflected waves corresponding to faulty channels. In order to further reduce the adjacent mode components, according to Embodiment 1 of the present invention, the tunable band pass filter 105 is positioned between port no. 2 of the four-port optical circulator 111 and the light source 103 so that monitoring light, which has been generated in a quasi-single mode, is filtered once more. However, it can be easily understood by those skilled in the art that, if the power of adjacent mode components is not so large that they act as noise when a failure on a specific channel is to be positioned, the tunable band pass filter 105 may be positioned between port no. 4 of the N-BLS 101 and port no. 1 of the four-port optical circulator 111. Such modification of position of the tunable band pass filter 105 is applicable not only to the embodiment shown in FIG. 1, but also to that shown in FIG. 4, which is an alternative embodiment.

According to the present invention, the N-BLS 101 selects a proper band, which is not the transmission signal band, based on the fact that the transmission characteristics of the AWG 128 are periodical according to the wavelength. According to a preferred embodiment of the present invention, the photo detector 106 may be implemented by using a PIN-PD or APD (Avalanche Photo Diode). The signal processing unit 107 may include an amplifier, an analog/digital converter, and an averager. The description of components of the photo detector 106 and the signal processing unit 107 equally applies to photo detectors 406, 506, 606, 706, 806, 906, 1006, and 1106 and signal processing units 407, 507, 607, 707, 807, 907, 1007, and 1107 according to other embodiments of the present invention shown in FIGS. 4 to 11.

As shown in FIG. 1, Embodiment 1 of the present invention is characterized in that an N-BLS 101 is used to inject monitoring light, which has a band different from that of data transmission signals, for use in an apparatus for monitoring failure positions. Particularly, Embodiment 1 shown in FIG. 1 replaces optical couplers 770 and 771 used in Embodiment 2 shown in FIG. 7 with a CWDM 102, which has smaller insertion loss, so that the loss of transmission signals is reduced. In addition, when backscattered and reflected, the monitoring light is not affected by backscattering light resulting from data transmission channels. This means that the monitoring light does not need to pass through the tunable band pass filter 105 during a reception process of the monitoring light. As a result, loss of the monitoring light itself is reduced, and the range of monitoring failure positions is further extended.

Figure 7:
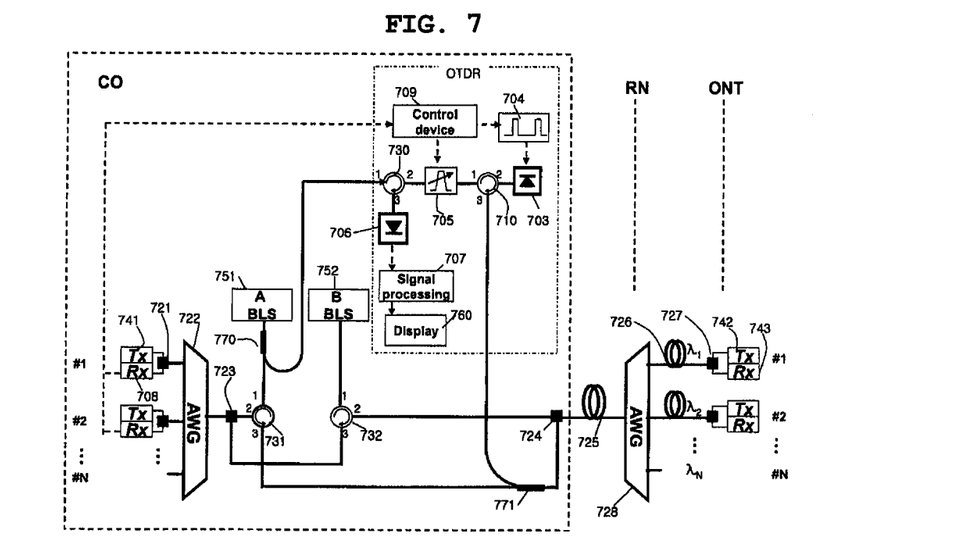
FIG. 7 shows the construction of an apparatus for monitoring failure positions on fibers and a WDM-PON system having the apparatus according to Embodiment 2 of the present invention.

Furthermore, the apparatus for monitoring failure positions according to Embodiment 1 according to the present invention is advantageously applicable not only to the WDN-PON system shown in FIG. 1, but also to any type of conventional WDM-PON system, including that shown in FIG. 7.

Figure 3:
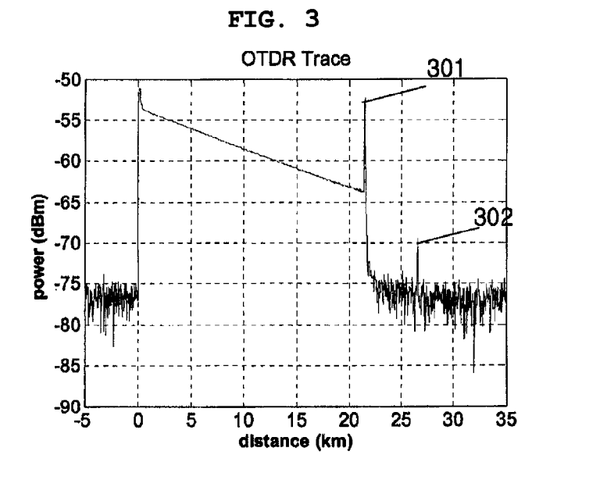
FIG. 3 is a graph showing backscattering and power of reflected light as a function of time when monitoring light, which has been modulated as pulses, is used in the apparatus for monitoring failure positions on fibers and the WDM-PON system having the apparatus shown in FIG. 1.

FIG. 3 is a graph showing backscattering and power of reflected light as a function of time when monitoring light, which has been modulated as pulses, is used in the apparatus for monitoring failure positions on fibers and the WDM-PON system having the apparatus shown in FIG. 1. Referring to FIG. 3, as the monitoring light is inputted to a fiber and propagates through it, the light is backscattered and, as a result of loss based on distance, the signal intensity weakens. Signals are reflected at a spot (26.8 Km) where the fiber is broken. This makes it possible to monitor the failure positions on the fiber. In FIG. 3, a larger reflected wave generated by the AWG 128 is labeled 301, and a reflected wave generated at the failure position is labeled 302. The time difference between the moment of input of the monitoring light and the moment of generation of the reflected wave 302 at the failure position is 268 µs, which is multiplied by the propagation speed of light inside the fiber. As a result of the calculation, the traveling distance is 26.8 Km, from which the failure position is known.

Figure 4:
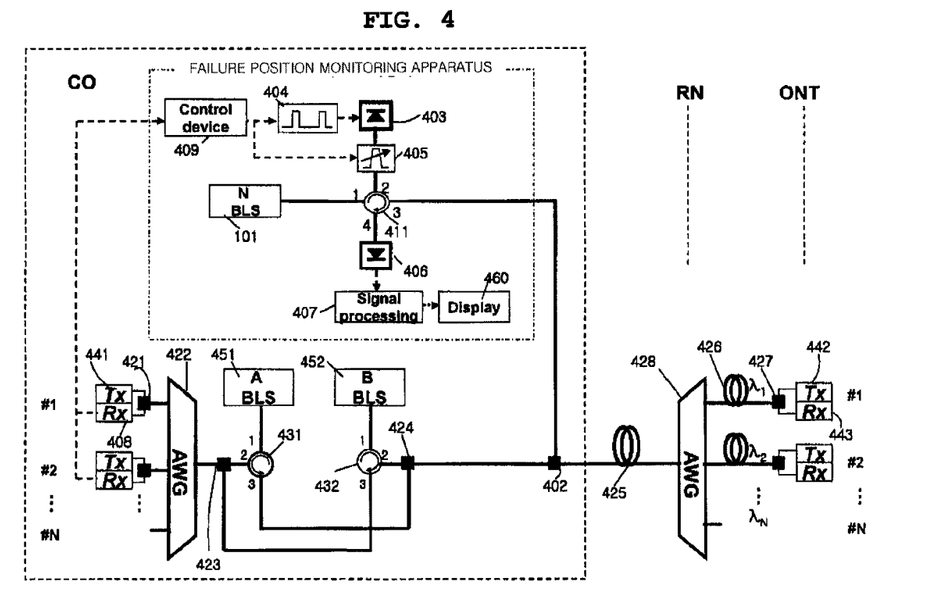
FIG. 4 shows a WDM-PON system having an additional control device for controlling the apparatus for monitoring failure positions according to an alternative embodiment to Embodiment 1 shown in FIG. 1.

FIG. 4 shows a WDM-PON system having an additional control device for controlling the apparatus for monitoring failure positions according to an alternative embodiment to Embodiment 1 shown in FIG. 1. When there is no failure in the apparatus for monitoring failure positions on feeders and the WDM-PON system having the apparatus according to Embodiment 1 of the present invention, the process for transmitting and receiving optical signals and the monitoring light generation mechanism of the apparatus are substantially identical to those in the case of Embodiment 1 shown in FIG. 1, and repeated description thereof will be omitted herein.

The operation of the control device 409 shown in FIG. 4 will now be described in detail when it is used in an apparatus for monitoring failure positions on fibers.

Referring to FIG. 4, if any of the feeders 425 and 426 is broken or has a different type of failure while the WDM-PON system having the apparatus for monitoring failure positions on feeders is functioning normally, light received by the receiver 408 of CO becomes very weak, and so do electrical signals converted therefrom. In this case, the control device 409, which is electrically connected to all receivers 408, determines the faulty channel, drives the signal generator 404 so as to generate monitoring electric pulse signals for positioning the failure, and adjusts the tunable band pass filter 405 so as to coincide to the wavelength corresponding to the faulty channel. Then, light outputted by the N-BLS 401 is routed by the four-port optical circulator 411. After passing through the tunable band pass filter 405, the light has a smaller bandwidth and is injected into the light source 403, which is locked with regard to a wavelength corresponding to the faulty channel. The light source 403 oscillates in a quasi-single mode as shown in the lower half of FIG. 2 and is modulated by the signal generator 404. After passing through the tunable band pass filter 405, the monitoring light has a waveform having a wavelength corresponding to the faulty channel. The difference between the embodiments shown in FIGS. 1 and 4 is that, in the latter case, the control device 409 can instantly identify the faulty channel.

After being inputted to the feeder fiber 425 via the four-port optical circulator 411 and the CWDM 402, the wavelength-locked monitoring light propagates through the fibers 425 and 426 and undergoes backscattering and reflection. Then, the light is received by the photo detector 406 via the CWDM 402 and the optical circulator 411. The received light is converted into electric signals, which pass through the signal processing unit 407 for noise reduction and are displayed by the display unit 460.

The tunable band pass filters 105 and 405 according to Embodiment 1 shown in FIG. 1 and the alternative embodiment shown in FIG. 4, respectively, have such characteristics that they pass light only in a specific wavelength range. As the tunable band pass filters 105 and 405, filters having a 3 dB bandwidth of B nm (B is an arbitrary real number) are used. Based on the channel spacing of the AWG, the value of B may be, for example, 0.2 nm, 0.4 nm, or 0.8 nm.

Figure 5:
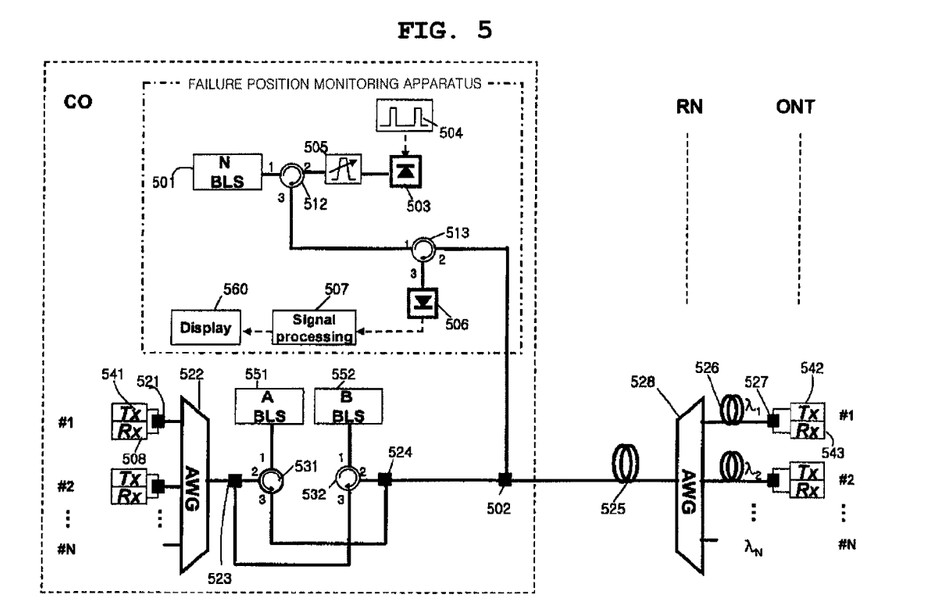
FIG. 5 shows an alternative embodiment to Embodiment 1 shown in FIG. 1.
Figure 6:
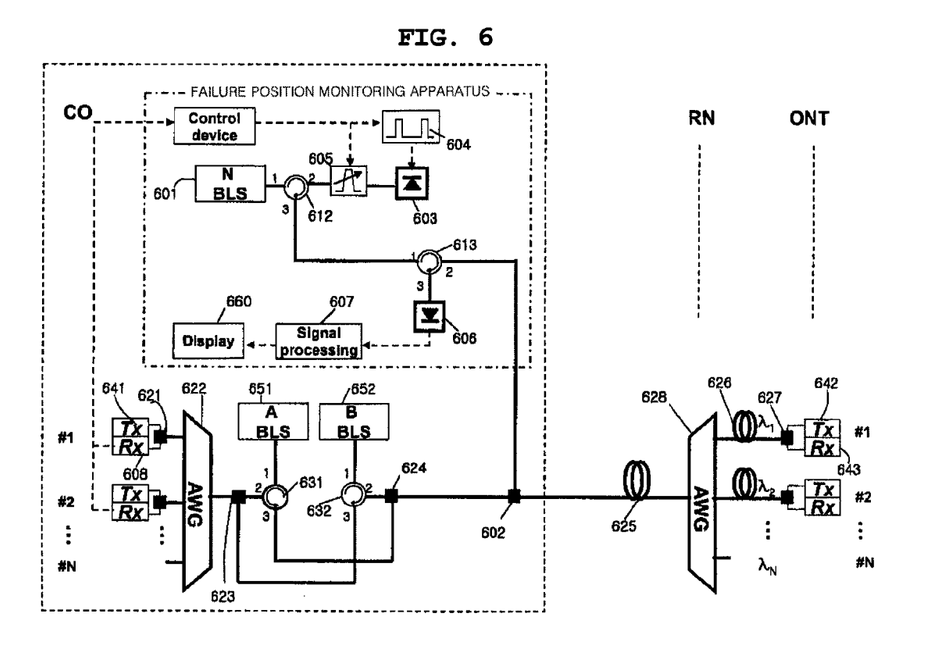
FIG. 6 shows a WDM-PON system according to an alternative embodiment to the embodiment shown in FIG. 4.

FIG. 5 shows an alternative embodiment to Embodiment 1 shown in FIG. 1, and FIG. 6 shows a WDM-PON system according to an alternative embodiment to the embodiment shown in FIG. 4. Referring to FIGS. 5 and 6, each four-port optical circulator 111 and 411 of the monitoring light generation unit shown in FIGS. 1 and 4 is replaced with two three-port optical circulators 512 and 513; 612 and 613 for the same operation.

Referring to FIG. 5, light outputted by the N-BLS 501 is routed by the three-port optical circulator 512 and, after passing through the tunable band pass filter 505, has a smaller bandwidth. The light is then injected into the light source 503, which oscillates in a quasi-single mode as shown in the lower half of FIG. 2 and which is modulated by the signal generator 504. The resulting light has suppressed adjacent modes as shown in the lower half of FIG. 2. Although the adjacent modes may be weak, they may act as noise when combined together and interfere with failure positioning. Therefore, the adjacent modes must be filtered through the tunable band pass filter. In this case, the tunable band pass filter 505 may be adjusted so as to coincide the wavelength corresponding to channels numbered 1 to N $\lambda_1, \lambda_2 \ldots \lambda_N$, in order to obtain a monitoring light waveform having wavelengths corresponding to respective channels. The monitoring light is inputted to the feeder fiber 525 via two three-port optical circulators 512 and 513 and a CWDM 502. The inputted monitoring light propagates through the fibers 525 and 526 and undergoes backscattering and reflection. Then, the light is passed via the CWDM 502 and the three-port optical circulator 513 and is received by the photo detector 506. The received light is converted into electric signals, which pass through the signal processing unit 507 for noise reduction and are displayed by the display unit 560.

In the case of the embodiment shown in FIG. 6, if any of the feeders 625 and 626 is broken or has a different type of failure while the apparatus for monitoring failure positions on feeders and the WDM-PON system having the apparatus are functioning normally, light received by the receiver 608 of CO becomes very weak, and so do electrical signals converted therefrom. Then, the control device 609, which is electrically connected to all receivers 608, determines the faulty channel, drives the signal generator 604 so as to generate monitoring electric pulse signals for positioning the failure, and adjusts the tunable band pass filter 605 so as to coincide the wavelength corresponding to the faulty channel. Then, light outputted by the N-BLS 601 is routed by the three-port optical circulator 612. After passing through the tunable band pass filter 605, the light has a smaller bandwidth and is injected into the light source 603, which is locked with regard to a wavelength corresponding to the faulty channel. The light source 603 oscillates in a quasi-single mode, and the resulting monitoring light is modulated by the signal generator 604. The modulated monitoring light routes through two three-port optical circulators 612 and 613 and a CWDM 602 and is inputted to the feeder fiber 625. The inputted monitoring light propagates through the fibers 625 and 626 and undergoes backscattering and reflection. Then, the light is passed via the CWDM 602 and the three-port optical circulator 613 and is received by the photo detector 606. The received light is converted into electric signals, which pass through the signal processing unit 607 for noise reduction and are displayed by the display unit 660.

The N-BLSs 501 and 601 shown in FIGS. 5 and 6, respectively, select a proper band, which is not the transmission signal band, based on the fact that the transmission characteristics of the AWGs 528 and 628 are periodical according to the wavelength, as in the case shown in FIG. 1.

In addition, the position of the tunable band pass filters 505 and 605 of the apparatuses for monitoring failure positions according to the embodiments shown in FIGS. 1 and 4, respectively, may be modified in the same manner as shown FIGS. 1 and 4. More particularly, when the incoherent ASE light is injected from outside and monitoring light is generated as a result of oscillation in a quasi-single mode, the monitoring light has suppressed adjacent mode components as shown in the lower half of FIG. 2. According to the embodiments shown in FIGS. 5 and 6, the light passes through the tunable band pass filter once more so that adjacent mode components are further suppressed and only the wavelength of the faulty channel is passed. However, those skilled in the art can easily understand that, if the degree of backscattering and the size of reflected waves resulting from the adjacent mode components of the monitoring light are not so large that they act as noise with regard to backscattering and reflected waves in the faulty channel, the light does not need to pass through the tunable band pass filters 505 and 605 once more. Therefore, the tunable band pass filters 505 and 605 according to the embodiments shown in FIGS. 5 and 6 may be positioned between the N-BLSs 501 and 601 and port no. 1 of the optical circulators 512 and 612, respectively, instead of being positioned between the optical circulators 512 and 612 and the monitoring light sources 503 and 603.

Embodiment 2

FIG. 7 shows the construction of an apparatus for monitoring failure positions on fibers and a WDM-PON system having the apparatus according to Embodiment 2 of the present invention. The WDM-PON system according to the present embodiment is characterized in that a BLS having uplink and downlink transmission bands is utilized so that a wavelength-locked F-P LD can be utilized as a transmission light source. However, those skilled in the art can easily understand that the use of F-P LD in the WDM-PON system according to Embodiment 2 is only an example, and a different type of transmission light source may also be used as required.

Referring to FIG. 7, although an inexpensive F-P LD is used as a light source for data transmission in the apparatus for monitoring failure positions on fibers and the WDM-PON system having the apparatus according to Embodiment 2 of the present invention, the F-P LD cannot be used as a WDM light source, because, in terms of wavelength range, it oscillates in a multi-mode as shown in the upper half of FIG. 2. However, when the incoherent ASE light generated by A-BLS and B-BLS 751 and 752 is injected via AWGs 722 and 728, light having a wavelength determined for each port of the AWGs 722 and 728 is injected to an F-P LD in each transmitter 741 and 742 of the uplink and downlink. The transmitters 741 and 742 have an F-P LD adapted to receive light injected from outside and oscillate in a quasi-single mode as shown in the lower half of FIG. 2, as well as a modulation circuit. The transmitters 741 and 742 transmit information signals between a CO and a plurality of ONTs. The transmitters 741 and 742 modulate desired information signals and transmit them to the F-P LD, which oscillates in a quasi-single mode, so as to enable communication between the CO and the ONTs. Receivers 708 and 743 have a photo detector for receiving transmitted light and converting it into an electric signal, as well as an amplification/decision circuit. The receivers 708 and 743 receive information signals between the CO and the ONTs.

Transmission of optical signals via downlink will now be described. Light outputted from an A-BSL 751 of the CO is inputted to port no. 1 of a three-port optical circulator 731 and outputted via port no. 2. After passing through a WDM 723, an AWG 722, and a WDM 721, the light is injected into an F-P LD inside the transmitter 141 of respective channels. The transmitter 741 modulates desired information signals and loads them onto an F-P LD, which oscillates in a quasi-single mode. The transmitter 741 transmits the signals to the AWG 722 via the WDM 721. Then, the AWG 722 multiplexes optical signals of various channels $\lambda_1, \lambda_2 \ldots \lambda_N$. The multiplexed light is inputted to port no. 2 of the three-port optical circulator 731 via the WDM 723 and is transmitted to an RN via port no. 3, a optical coupler 771, a WDM 724, and a feeder fiber 725. The AWG 728 of the RN demultiplexes received optical signals into various wavelengths and transmits them to respective ONTs via distributed fibers 726. After reaching each ONT, the optical signals are transmitted towards only the receiver 743 by the WDM 727, so that respective ONTs obtain necessary information.

Transmission of optical signals from respective ONTs to the CO via uplink is substantially identical to the above-mentioned transmission via downlink. In particular, light outputted from a B-BLS 752 routes through the three-port optical circulator 732, the WDM 724, the feeder fiber 725, the AWG 728, the distributed feeder 726, and the WDM 727 and is injected into the F-P LD of the ONT-side transmitter 742.

The transmitter 742 modulates desired information signals and loads them onto the F-P LD, which oscillates in a quasi-single mode. The signals successively pass through the WDM 727, the distributed feeder 726, the AWG 728, and the feeder fiber 725 and are inputted to the three-port optical circulator 732 via the WDM 724. Particularly, the light is inputted to port no. 2 of the three-port optical circulator 732 and outputted via port no. 3. Then, the light passes through the WDM 723, the AWG 722, and the WDM 721 and is inputted to the receiver 708 of the CO.

If any of the feeders 725 and 726 is broken or has a different type of failure while the WDM-PON system according to Embodiment 2 of the present invention is functioning normally, light received by the receiver 708 of the CO becomes very weak, and so do electrical signals converted therefrom. In this case, the control device 709, which is electrically connected to all receivers 708, determines the faulty channel, drives the signal generator 704 so as to generate monitoring electric pulse signals for positioning the failure, and adjusts the tunable band pass filter 705 so as to coincide the wavelength corresponding to the faulty channel. Then, light outputted by the A-BLS 751 is split by the optical coupler 770 and is injected into the light source 703 via the three-port optical circulator 730, the tunable band pass filter 705, and the three-port optical circulator 710. The light source 703 is locked with regard to a wavelength corresponding to the faulty channel and oscillates in a quasi-single mode as shown in the lower half of FIG. 2. The resulting monitoring light is modulated by the signal generator 704. The modulated monitoring light is routed by the three-port optical circulator 710 and is inputted to the feeder fiber 725 via the optical coupler 771 and the WDM 724. As the inputted monitoring light propagates through the fibers 725 and 726, it undergoes backscattering and reflection. Then, the monitoring light passes through the WDM 724, the optical coupler 771, the three-port optical circulator 710, and the tunable band pass filter 705. As a result, backscattered and reflected light resulting from the monitoring light are passed, but backscattered and reflected light resulting form adjacent data transmission signals are filtered. The monitoring light is received by the photo detector 706 via the three-port optical circulator 730 and is converted into electric signals, which are subjected to an averaging process for noise reduction by the signal processing unit 707 and are displayed by the display 760. The optical couplers 770 and 771 according to Embodiment 2 of the present invention can split optical power at a ratio of 1:r (r is an arbitrary real number) or couple split light.

Compared with Embodiment 1, Embodiment 2 is characterized in that the failure position monitoring apparatus uses the incoherent ASE light inputted from an external BLS 751 in the transmission signal band so as to obtain monitoring light. Therefore, Embodiment 2 shown in FIG. 7 cannot be used for general WDM-PON systems, but is applicable to WDM-PON systems using a wavelength-locked F-P LD, into which the incoherent ASE light is injected, as the transmission signal.

Embodiment 3

Figure 8:
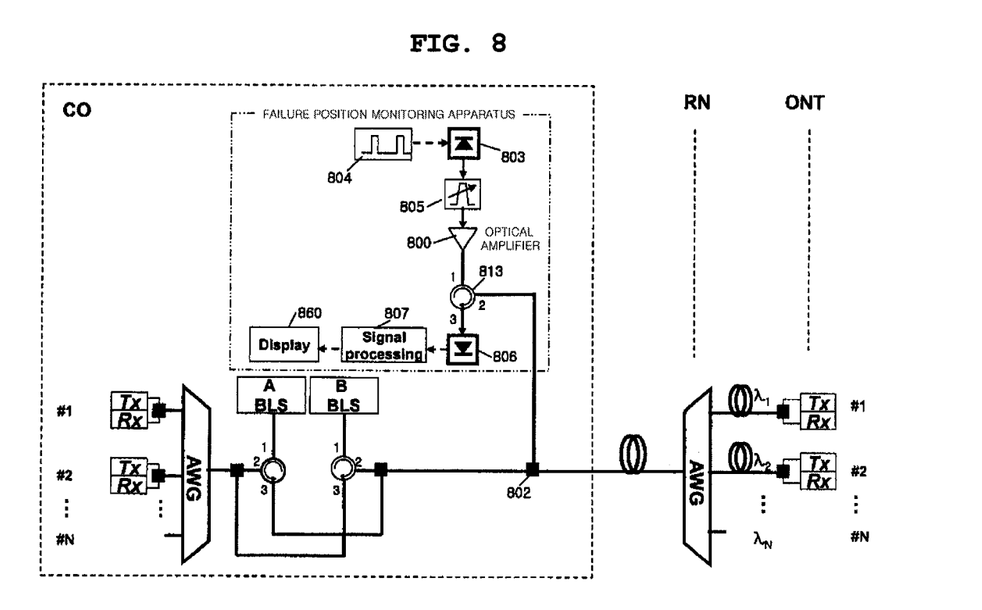
FIG. 8 shows the construction of an apparatus for monitoring failure positions in a WDM-PON system without using a BLS and a WDM-PON system having the apparatus according to Embodiment 3 of the present invention.

FIG. 8 shows the construction of an apparatus for monitoring failure positions in a WDM-PON system without using a BLS and a WDM-PON system having the apparatus according to Embodiment 3 of the present invention. Embodiment 3 is characterized in that monitoring light for monitoring failure positions is generated without using a BLS, and other construction is the same as Embodiment 1 shown in FIG. 1. The apparatus for monitoring failure positions shown in FIG. 8 includes a signal generator 804 for generating monitoring electric pulse signals, which are used to monitor the failure positions on feeders; a light source 803 modulated by the signal generator 804 so as to convert the pulse signals into monitoring light and output the light; a tunable band pass filter 805 for passing only a predetermined wavelength range while tuning the wavelength; an optical amplifier 800 for amplifying the monitoring light, which has been filtered by the tunable band pass filter 805; a three-port optical circulator 813 for routing the monitoring light, which has been amplified by the optical amplifier 800, to a single fiber and receiving the monitoring light, which has been backscattered and reflected on the fiber, so as to route the light output; a photo detector 806 for receiving the monitoring light, which has been routed and outputted by the three-port optical circulator 813 and which has been backscattered and reflected, converting the light into electric signals, and outputting them; a signal processing unit 807 for reducing noise from the converted electric signals, which have been outputted by the photo detector 806, and outputting them; and a display unit 860 for displaying failure positions based on the result of failure positioning by the signal processing unit 807. As the optical amplifier according to Embodiment 3, an EDFA or SOA may be used.

Components of the WDM-PON system shown in FIG. 8 are identical to those shown in FIG. 1, except for the apparatus for monitoring failure positions. Therefore, repeated description thereof will be omitted herein, and operation of the apparatus for monitoring failure positions will now be described. The signal generator 804 of the apparatus for monitoring failure positions shown in FIG. 8 generates monitoring light, which is modulated and outputted by the light source 803 so that it has a wide wavelength range. As the monitoring light passes through the tunable band pass filter 805, desired wavelengths are filtered. However, in contrast to the case in which the external incoherent ASE light is injected and only a single desired wavelength is amplified, the monitoring light outputted by the light source 803 according to the embodiment shown in FIG. 8 is filtered by the band pass filter 805, but is not amplified. Therefore, after passing the band pass filter 805, the monitoring light is amplified as desired by the optical amplifier 800. The monitoring light is then inputted to a single feeder via the three-port optical circulator 813 and the WDM 802. After being backscattered and reflected on the feeder, the monitoring light is converted into electric signals via the WDM 802, the three-port optical circulator 806, and the photo detector 806, as in the case of Embodiment 1. The converted electric signals pass through the signal processing unit 807 for noise reduction and are displayed by the display unit 860.

Although the apparatus for monitoring failure positions shown in FIG. 8 uses an additional optical amplifier 800 compared with the case of Embodiment 1, the apparatus can generate high-power monitoring light without using a BLS so that it can position failures in an increased range. Furthermore, the apparatus for monitoring failure positions shown in FIG. 8 has the same advantage as in the case of Embodiment 1, i.e. it can check every channel's failure while continuously adjusting the tunable band pass filter.

Figure 9:
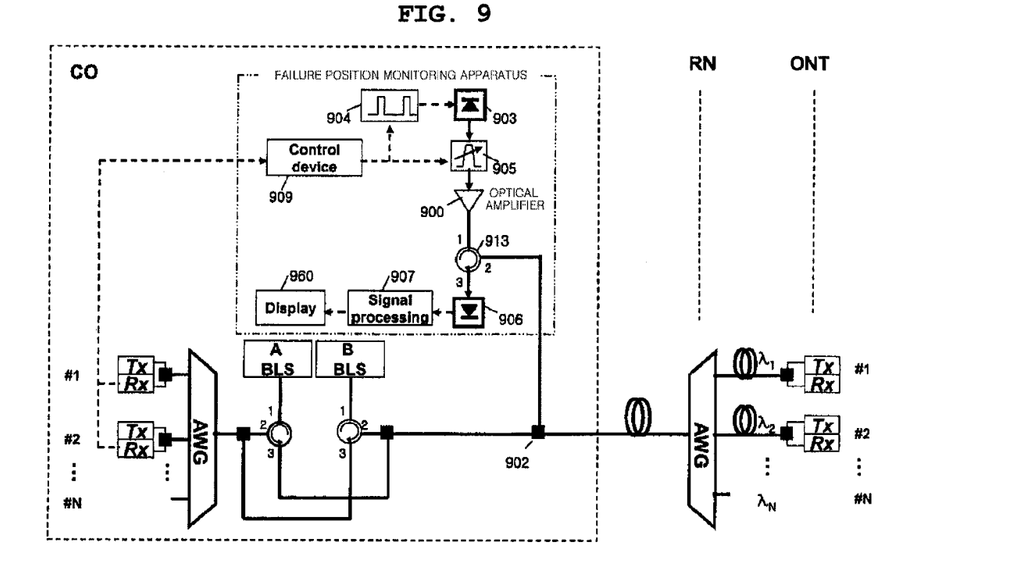
FIG. 9 shows an alternative embodiment to Embodiment 3 shown in FIG. 8.

FIG. 9 shows an alternative embodiment to Embodiment 3 shown in FIG. 8. The apparatus for monitoring failure positions and the WDM-PON system having the apparatus shown in FIG. 9 have substantially the same operation as in the case of Embodiment 3 shown in FIG. 8, except for an additional control device 909.

The apparatus for monitoring failure positions shown in FIG. 9 includes a signal generator 904 for generating monitoring electric pulse signals, which are used to monitor failure positions on feeders; a light source 903 modulated by the signal generator 904 so as to convert the pulse signals into monitoring light and output the light; a tunable band pass filter 905 for passing only a predetermined wavelength range while tuning the wavelength; a control device 909 for driving the signal generator 904 and controlling the tunable band pass filter 905; an optical amplifier 900 for amplifying the monitoring light, which has been filtered by the tunable band pass filter 905; a three-port optical circulator 913 for routing the monitoring light, which has been amplified by the optical amplifier 900, to a single fiber and receiving the monitoring light, which has been backscattered and reflected on the fiber, so as to route and the output light; a photo detector 906 for receiving the monitoring light, which has been routed and outputted by the three-port optical circulator 913 and which has been backscattered and reflected, converting the light into electric signals, and outputting them; a signal processing unit 907 for reducing noise from the converted electric signals, which have been outputted by the photo detector 906, and outputting them; and a display unit 960 for displaying failure positions based on the result of failure positioning by the signal processing unit 907.

Referring to FIG. 9, the control device 909, which is connected to all receivers Rx of the CO, determines the faulty channel, drives the signal generator 904 of the apparatus for monitoring failure positions, and adjusts the tunable band pass filter 905 so as to coincide the wavelength corresponding to the faulty channel. The light source 903 is modulated by the signal generator so as to output monitoring light having a large wavelength range. Therefore, the tunable band pass filter 905 is used to pass only a predetermined wavelength range of the monitoring light. After passing through the tunable band pass filter 905, the monitoring light has a wavelength corresponding to the faulty channel determined by the control device 909. This means that, in contrast to the apparatus for monitoring failure positions shown in FIG. 8, the apparatus shown in FIG. 9 can instantly identify the faulty channel by means of the control device 909.

Figure 10:
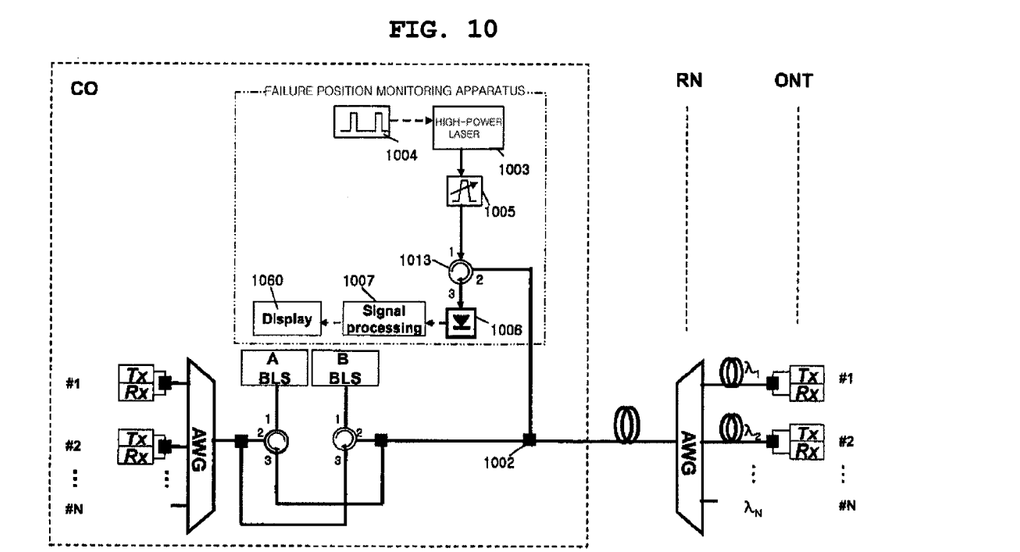
FIG. 10 shows another alternative embodiment to Embodiment 3 shown in FIG. 8.

FIG. 10 shows another alternative embodiment to Embodiment 3 shown in FIG. 8. More particularly, the apparatus for monitoring failure positions and the WDM-PON system having the apparatus shown in FIG. 10 aim at generating high-power monitoring light. To this end, the optical amplifiers 800 and 900 shown in FIGS. 8 and 9 are omitted, and high-power lasers are used instead of the light sources 803 and 903. The apparatus for monitoring failure positions shown in FIG. 10 includes a signal generator 1004 for generating electric pulse signals, which are used to monitor the failure positions on feeders; a high-power laser 1003 for outputting monitoring light modulated by the signal generator 1004; a tunable band pass filter 1005 for filtering the modulated high-power monitoring light, which has been outputted by the high-power laser 1003, so as to coincide a wavelength corresponding to a faulty channel and outputting the light to a single fiber; a three-port optical circulator 1013 for routing the high-output monitoring light, which has passed through the tunable band pass filter 1005, to the single fiber and receiving the monitoring light, which has been backscattered and reflected on the fiber, so as to route the output light; a photo detector 1006 for receiving the monitoring light, which has been routed and outputted by the three-port optical circulator 1013 and which has been backscattered and reflected, converting the light into electric signals, and outputting them; a signal processing unit 1007 for reducing noise from the converted electric signals, which have been outputted by the photo detector 1006, and outputting them; and a display unit 1060 for displaying failure positions based on the result of failure positioning by the signal processing unit 1007.

The principle of receiving the monitoring light, which is backscattered and reflected on the fiber, is the same as has been described with reference to FIGS. 8 and 9, and repeated description thereof will be omitted herein. In addition, those skilled in the art can easily understand that the failure position monitoring apparatus shown in FIG. 10, which uses a high-power laser 1003, is interchangeable with the failure position monitoring apparatuses shown in FIGS. 8 and 9.

Figure 11:
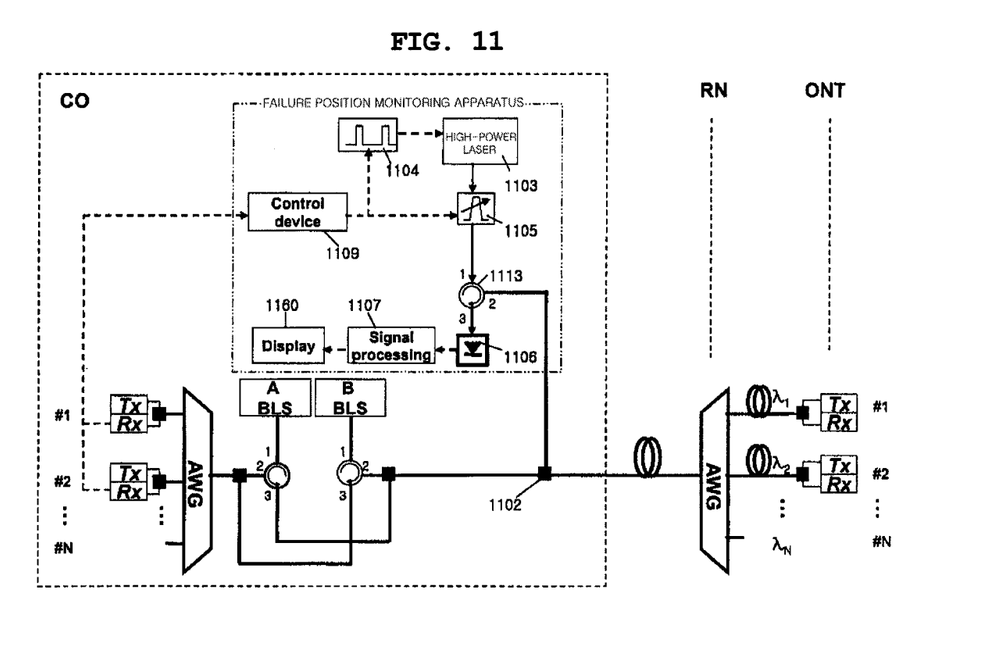
FIG. 11 shows an alternative embodiment to the embodiment shown in FIG. 10.

FIG. 11 shows an alternative embodiment to the embodiment shown in FIG. 10. More particularly, the apparatus for monitoring failure positions and the WDM-PON system having the apparatus shown in FIG. 11 have substantially the same construction as in the case of the embodiment shown in FIG. 10, except for an additional control device 1109. In addition, the operation of the failure position monitoring apparatus having a control device 1109 shown in FIG. 11 has substantially the same operation as the apparatus shown in FIG. 9, and repeated description thereof will be omitted herein.

Meanwhile, various types of light sources may be used for the failure position monitoring apparatuses according to Embodiments 1, 2, and 3, as will now be described in more detail.

A laser is one of commonly used light sources. Basically, the present invention uses an inexpensive F-P LD, which oscillates in a multi-mode. As mentioned above, FIG. 2 shows a multi-mode spectrum of a conventional F-P LD in the upper half, and FIG. 12 magnifies the spectrum.

Figure 12:
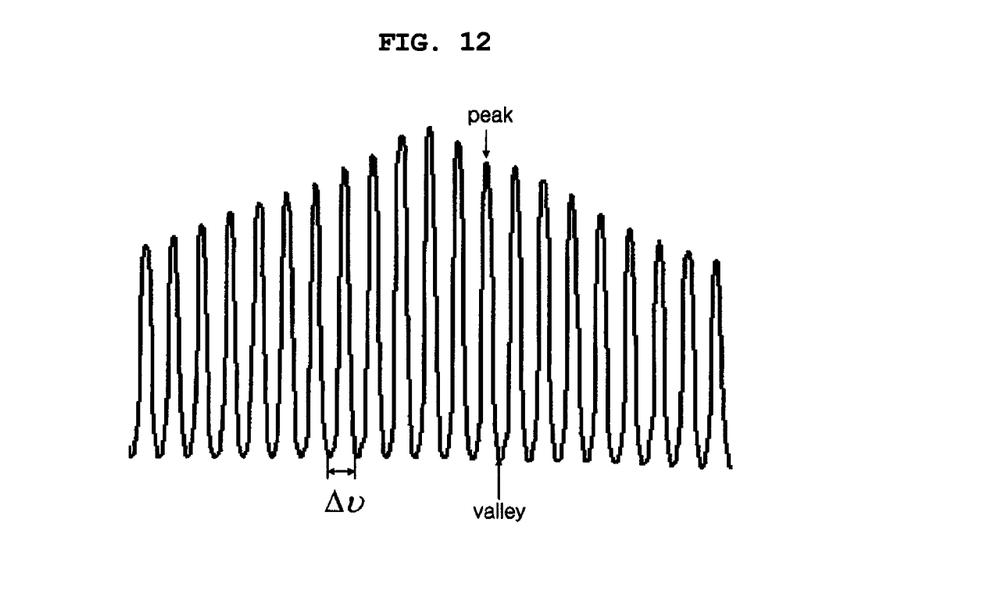
FIG. 12 magnifies the multi-mode spectrum of an F-P LD shown in the upper half of FIG. 2.

Referring to FIG. 12, the oscillation of the F-P LD is characterized in that peaks and valleys alternate with each other depending on the wavelength (i.e. multi-mode). According to the present invention, the incoherent ASE light is injected from outside solely into a wavelength range corresponding to a faulty channel so that the F-P LD oscillates in a quasi-single mode as shown in the lower half of FIG. 2. Alternatively, a corresponding wavelength from a high-power laser is selectively filtered so that the laser is used as a light source for a failure position monitoring apparatus. However, if a failure occurs in a wavelength corresponding to one of the valleys shown in FIG. 12, not of peaks, or if a the incoherent ASE light source is injected into one of the valleys due to the characteristics of the laser, the oscillation mode wavelength of which varies depending on the temperature, the output of monitoring light from the light source for the failure position monitoring apparatus may weaken undesirably.

Four methods for preventing the output of the monitoring light from weakening will now be described.

According to the first method proposed by the present invention, an F-P LD having a long cavity length is used as a light source for the failure position monitoring apparatus so that the mode interval of the F-P LD is narrower than the bandwidth of the tunable band pass filter, as indicated by $\Delta u$ in FIG. 12.

According to the second method proposed by the present invention, an F-P LD is used as a light source for the failure position monitoring apparatus so as to sweep the temperature of a TEC (Thermo-Electric Cooler), so that the oscillation wavelength is swept accordingly. Lasers are sensitive to temperature, and their oscillation mode wavelength varies depending on temperature. In order to prevent change in wavelength resulting from temperature, a TEC is commonly used to maintain the temperature of the laser. However, instead of fixing the temperature of the laser, the second method proposed by the present invention uses a TEC so as to repeatedly raise/lower the temperature so that the wavelength varies as much as the oscillation mode interval of the laser. This avoids the worst situation in which an external the incoherent ASE light source is injected into a valley as shown in FIG. 12 and maintains the output of the monitoring light for the failure position monitoring apparatus above a predetermined level on average.

Figure 13:
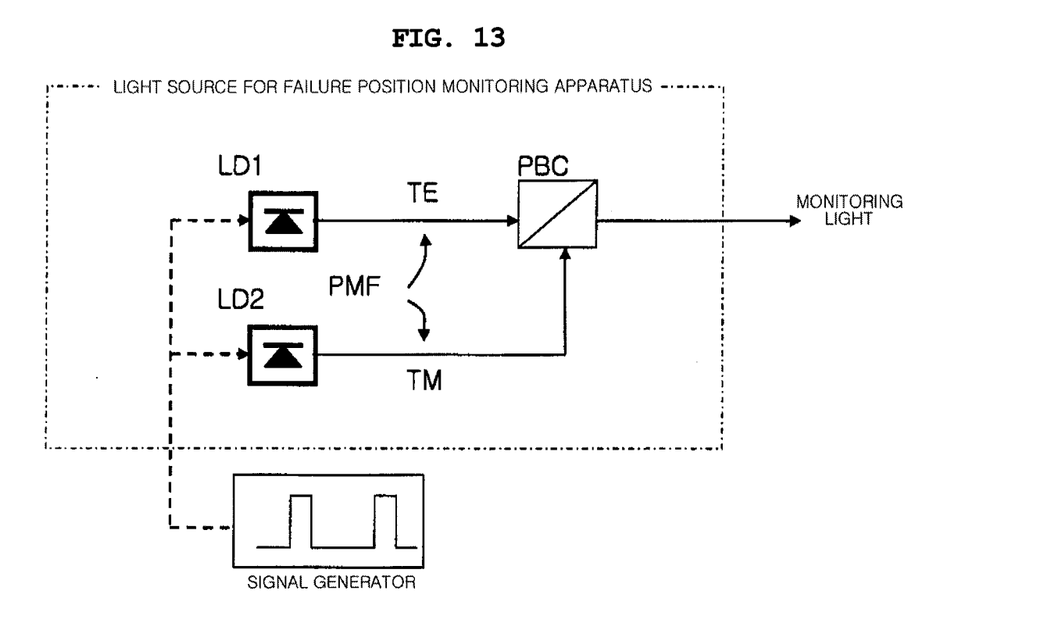
FIG. 13 shows two F-P LDs used as polarization-multiplexed light sources for monitoring failure positions according to the present invention.

According to the third method proposed by the present invention, a polarization-multiplexed light source is used, as disclosed in a paper entitled "WAVELENGTH SELF MANAGED OPTICAL WDM SOURCE USING POLARIZATION-MULTIPLEXED FABRY-PEROT LASER DIODES" by LEE, Chang-Hee et al. (inventors of the present invention), pp. 2347-2349, No. 10, Vol. 16 of IEEE Photonics Technology Letters, October, 2004 (the whole contents of the paper is incorporated herein for reference). More particularly, two F-P LDs are used as the light source of the failure position monitoring apparatus so as to constitute a polarization-multiplexed light source, as shown in FIG. 13. Those skilled in the art can easily understand that, although two F-P LDs are shown in FIG. 13 and used as the polarization-multiplexed light source for the failure position monitoring apparatus, N (N is an arbitrary natural number) F-P LDs may be used as desired. Referring to FIG. 13, two F-P LDs are coupled to each other so that their oscillation modes have different offsets. Particularly, valleys of LD1 coincide with peaks of LD2, and the LD1 and LD2 are adjusted by using a PMF (Polarization Maintaining Fiber) so that the polarization of LD1 is perpendicular to that of LD2. Then, the LD1 and LD2 are coupled to each other via a PBC (Polarization Beam Coupler). This secures stable output of monitoring light from the light source for the failure position monitoring apparatus. In addition, the output of the monitoring light is larger than in the case of a single LD, because the output corresponds to the sum of the output of LD1 and LD2.

According to the fourth method proposed by the present invention, an RSOA (Reflective Semiconductor Optical Amplifier) is used as the light source of the failure position monitoring apparatus. Compared with the optical output spectrum of an F-P LD, the spectrum of the RSOA has a smaller difference between the optical output at peaks and that at valleys. This means that, even when the incoherent ASE light is injected into valleys, a larger output of monitoring light is generated.

Industrial Applicability

As can be seen from the foregoing, the present invention is advantageous in that it can position failures on channels in a WDM-PON system while maintaining transmission via other channels, as well as check if other channels are functioning normally in an economic manner. Therefore, any failure in the WDM-PON system is accurately positioned for fast recovery. This reduces the cost for repair and maintenance and improves the reliability of the WDM-PON system.

While this invention has been described in connection with what is presently considered to be the most practical and preferred embodiment, it is to be understood that the invention is not limited to the disclosed embodiment and the drawings, but, on the contrary, it is intended to cover various modifications and variations within the spirit and scope of the appended claims.

The invention claimed is:

1. An apparatus comprising:
a light source to generate a first monitoring light to propagate over a fiber, the fiber configured to transmit data in at least one of data transmission wavelength bands;
a first broadband light source ("BLS") for outputting an incoherent light in a monitoring wavelength band that is different from the at least one of the data transmission wavelength bands, the incoherent light to be injected into the light source to generate the first monitoring light;
a tunable band pass filter coupled to the BLS to pass one or more wavelengths of the incoherent light in the monitoring wavelength band to be injected into the light source;
a coarse wavelength division multiplexer ("CWDM" couple between the tunable band pass filter and the fiber to propagate the first monitoring light over the fiber;
a photo detector to receive a second monitoring light via the CWDM, wherein the second monitoring light includes the first monitoring light backscattered on the fiber,
an optical circulator comprising
a first port coupled to the first broadband source,
a second port to route the incoherent light to inject into the light source,
a third port to route the first monitoring light from the light source to the fiber, and
a fourth port to route the second monitoring light from the fiber to the photo detector.

2. The apparatus of claim 1, further comprising
a signal generator to modulate the light source.

3. The apparatus of claim 1, further comprising
a signal processing unit coupled to the photo detector, and
a display unit coupled to the signal processing unit.

4. The apparatus as claimed in claim 1, further comprising
a control device coupled to the tunable band pass filter, the control device to determine a faulty channel, and to adjust a wavelength of the first monitoring light to correspond to the faulty channel.

5. The apparatus of claim 1, wherein the optical circulator is a four-port optical circulator.

6. The apparatus of claim 1, wherein the light source includes a Fabry-Perot laser diode ("F-P LD").

7. The apparatus of claim 1, wherein the light source includes a thermoelectric cooler ("TEC") to sweep an oscillation mode wavelength.

8. The apparatus of claim 1, wherein the light source includes a plurality of polarization-multiplexed light sources.

9. The apparatus of claim 1, wherein the light source includes a reflective semiconductor optical amplifier.

10. The apparatus of claim 1, wherein the light source is a laser diode having an anti-reflection coating or a coating having a front facet reflectivity of 0- 33%.

11. A WDM-PON system, comprising:
a feeder fiber,
a first plurality of transmitters to transmit first information signals in at least a first wavelength band via the feeder fiber,
a first light source capable of lasing to generate a first monitoring light;
a first broadband light source ("BLS") for outputting an incoherent light in a monitoring wavelength band that is different from the at least one of the data transmission wavelength bands, the incoherent light to be injected into the first light source capable of lasing to generate the first monitoring light;
a tunable band pass filter coupled to the BLS to pass one or more wavelengths of the incoherent light in the monitoring wavelength band to be injected into the first light source capable of lasing;
a coarse wavelength division multiplexer ("CWDM") coupled between the tunable band pass filter and the feeder fiber to propagate the first monitoring light over the feeder fiber;
a photo detector to receive a second monitoring light via the CWDM, the second monitoring light includes the first monitoring light backscattered on the feeder fiber,
an optical circulator comprising
a first port coupled to the first BLS,
a second port to route the incoherent light to inject into the first light source capable of lasing,
a third port to route the first monitoring light from the light source to the feeder fiber, and
a fourth port to route the second monitoring light from the feeder fiber to the photo detector.

12. The WDM-PON system of claim 11, further comprising
a second plurality of distributed fibers coupled to the feeder fiber, and
a third plurality of receivers to receive the first information signals via the second plurality of distributed fibers.

13. The WDM-PON system of claim 11, wherein the first light source capable of lasing includes a Fabry-Perot laser diode ("F-P LD").

14. The WDM-PON system of claim 11, wherein the first light source capable of lasing includes a thermoelectric cooler ("TEC") to sweep an oscillation mode wavelength.

15. The WDM-PON system of claim 11, wherein the first light source capable of lasing includes a plurality of polarization-multiplexed light sources.

16. The WDM-PON system of claim 11, wherein the first light source capable of lasing includes a reflective semiconductor optical amplifier.

17. The WDM-PON system of claim 11, wherein the monitoring wavelength band is selected from the group consisting of O, E, S, C, L, and U bands proposed by International Telecommunications Union ("ITU").

18. The WDM-PON system of 11, wherein the first light source capable of lasing is a laser diode having an anti-reflection coating or a coating having a front facet reflectivity of 0-33%.

19. The WDM-PON system of claim 11, wherein the feeder fiber is a single-mode fiber.

20. The WDM-PON system of claim 11, wherein the optical circulator is a four-port optical circulator.

* * * * *